United States Patent
Claytor et al.

[15] 3,655,256
[45] Apr. 11, 1972

[54] HOLOGRAPHY WITH THERMOCHROMIC RECORDING MATERIALS

[72] Inventors: Richard N. Claytor, Arlington; Dayton D. Eden, Dallas, both of Tex.

[73] Assignee: Advanced Technology Center Inc., Grand Prairie, Tex.

[22] Filed: Jan. 4, 1971

[21] Appl. No.: 103,397

Related U.S. Application Data

[63] Continuation-in-part of Ser. No. 825,675, May 19, 1969, abandoned.

[52] U.S. Cl. ..............................350/3.5, 250/65 T, 346/76, 350/160 P
[51] Int. Cl. ......................................................G02b 27/00
[58] Field of Search..................350/3.5, 160 P; 250/83.31 R, 250/65 T; 346/76, 107, 108, 135.21; 40/28, 52; 340/324

[56] References Cited

UNITED STATES PATENTS

| | | | |
|---|---|---|---|
| 3,580,655 | 5/1971 | Leith et al. | 350/3.5 |
| 2,945,305 | 7/1960 | Strickler | 350/160 P |
| 3,219,993 | 11/1965 | Schwertz | 340/324 |
| 3,323,241 | 6/1967 | Blair et al. | 40/28 |
| 3,438,022 | 4/1969 | Teeg et al. | 340/324 |
| 3,516,185 | 6/1970 | Paine | 40/28 |
| 3,533,823 | 10/1970 | Newkirk et al. | 346/76 |

*Primary Examiner*—David Schonberg
*Assistant Examiner*—Ronald J. Stern
*Attorney*—Charles W. McHugh

[57] ABSTRACT

Disclosed are methods and apparatus for recording and reproducing optical information in thermochromic materials; exemplary materials are the ternary halides, ternary chalcogenides, and certain transition metal oxides. Methods and apparatus are also disclosed for recording holographic images with infrared radiation and reconstructing infrared holograms in the visible portion of the spectrum.

14 Claims, 7 Drawing Figures

INVENTORS.
RICHARD N. CLAYTOR
DAYTON D. EDEN

ATTORNEY

Patented April 11, 1972  3,655,256

INVENTORS.
RICHARD N. CLAYTOR
DAYTON D. EDEN

ATTORNEY

HOLOGRAPHY WITH THERMOCHROMIC RECORDING MATERIALS

This is a continuation-in-part of application Ser. No. 825,675, filed May 19, 1969 and now abandoned.

This invention relates to methods and apparatus for generating, recording, storing and reproducing or reconstruction optical information (e.g. images and data) in thermochromic materials. More specifically, it relates to methods and apparatus for producing holograms with long wavelength radiation and with radiation in portions of the visible spectrum; it also relates to methods and apparatus for reproducing visible optical information from holographic information recorded with long wavelength energy.

Certain groups of materials, generally known as thermochromic or thermotropic materials, exhibit a marked change in reflectance with change in temperature over a certain range. The term "thermochromic material" as used herein refers to material which exhibits hysteresis in changing from a first reflectance to a second reflectance (in a portion of the visible spectrum) with change in temperature over a certain range. For example, compounds having a general formula $M_2M'X_4$, where M may be $Ag^{1+}$, $Cu^{1+}$, or $Tl^{1+}$, and M' may be $Hg^{2+}$ or $Cd^{2+}$, and X is a halide, are known to exhibit thermochromism. Besides the ternary halides, other compounds exhibit thermochromism, including certain transition metal oxides (e.g., the vanadium oxides) and several ternary chalcogenides having the formula $MM'_2X_4$ where M is zinc, cadmium or mercury, M' is aluminum, gallium or indium, and X is sulphur, selenium or tellurium.

In accordance with this invention, the above-described materials are generally used in the form of a film or dried paint created by suspending a finely divided powder of such material in a suitable binder. The binder, however, is used merely as a convenient means to support a uniform layer of the thermochromic material. Other means for providing a substantially uniform layer of thermochromic material are also within the intended scope of the invention. The term "thermochromic material," therefore, is used herein to designate a layer, film or paint consisting essentially of materials of the class described which are suspended in any suitable medium or produced by any other acceptable means. Furthermore, since it is believed that the mechanisms by which such materials exhibit thermochromism are closely related in all such materials, cuprous mercuric iodide ($Cu_2HgI_4$) will be discussed hereinafter as exemplary of the entire class of compounds. It should be understood, however, that $Cu_2HgI_4$ is used herein as a typical example of thermochromic materials merely by way of illustration and not by limitation. Other materials of the class defined, under proper conditions, exhibit the phenomena described herein and may be substituted for $Cu_2HgI_4$ in appropriate application of the principles of this invention.

Paints or films of cuprous mercuric iodide change from a bright red at about room temperature to dark brown or black at about 66° C, and return to their original red appearance on being cooled to about 35° C. The change from red to black and black to red is not an isothermal change. Instead, when the material is heated from a temperature of about 40° C to a temperature of about 70° C, the material changes from red to black passing through intermediate shades of brown at intermediate temperatures. However, upon cooling the same material, essentially no change in color is observed until the material is reduced to about 62° C, and complete transition of black to red is not effected until the material is lowered to about 30° C. This phenomenon is analogous to the hysteresis phenomenon observed in magnetic materials, and is conveniently referred to as a "hysteresis effect." Hysteresis may alternatively be described as the existence of a plurality of reflectances for a given temperature within a certain temperature range.

It has been discovered that extremely high resolution recording of information can be obtained in thermochromic material by varying the temperature of selected discrete portions of the material within its hysteresis loop. The resolution obtained in producing such recordings can be effectively utilized to record extremely sharp images, and can be used in making holograms in the infrared as well as in portions of the visible spectrum. By standard photographic processes, an infrared hologram can be converted to a hologram in the visible portion of the spectrum, and the image reconstructed with visible light.

Furthermore, thermally generated images recorded in thermochromic materials in accordance with this invention may be indefinitely stored, reconstructed, or erased as desired.

Apparatus constructed and operated in accordance with the invention may be used to perform optical data processing (such as optical comparison and correlation) using long wavelength radiation. Long wavelength optical data processors constructed in accordance with the principles disclosed herein may employ relatively short focal lengths and still have a high processing power, i.e., a high number of resolvable elements, whereas optical data processors using visible portions of the spectrum must either use extremely long focal lengths or reduce the size of hard copy prior to processing. Accordingly, optical data processing can be performed according to this invention without reducing the size of the hard copy being processed, and with comparatively compact and inexpensive equipment. Hard copy is conveniently used hereinafter as matter which is prepared for examination by the unaided human eye, and includes printed and written words, letters, symbols, pictures, etc.

It is therefore an object of this invention to provide methods and apparatus for producing and recording holographic information with long wavelength radiation as well as with portions of the visible spectrum, and to provide methods and apparatus for reconstructing visible images from information recorded with long wavelength radiation.

Another object is to provide a recording medium having an extremely high resolution capability.

A further object is to provide a recording medium for holography which is sensitive to infrared radiation, and which can be re-used numerous times.

A still further object is to provide a technique for rendering a hologram temporarily insensitive to accidental change.

Other objects, features and advantages of the invention will become more readily understood from the following detailed description taken in connection with the appended claims and attached drawings in which:

Some of the phenomena exhibited by thermochromic materials generally utilized in connection with this invention will now be discussed with particular reference to $Cu_2HgI_4$. It will be understood that in the interest of simplicity, cuprous mercuric iodide is discussed as exemplary of the class of materials which may be used in accordance with the invention to demonstrate the principles involved.

Thermochromic materials used in accordance with this invention are deposited in a dried layer, e.g., in the form of a film of approximately 1 to 5 mils thickness applied to the surface of a substrate material or in a carrier such as a plastic film. Cuprous mercuric iodide is commercially available in the form of a dry powder which can be employed like any pigment for a paint. A suitable paint may be formed by mixing the powdered thermochromic material with a binder such as varnish, lacquer or the like. The paint may then be applied to the substrate by any suitable method such as dipping, brushing or spraying. Examples of varnishes which are compatible with cuprous mercuric iodide include those of the polyurethane type and the silicone type.

An optimum proportion for a mixture of powdered cuprous mercuric iodide in varnish is approximately 2.7 parts of material to one part varnish, by weight. If the mixture contains far too much of the powdered material, the mixture will be relatively difficult to apply, and the dried mixture will not be as smooth as might be desirable; furthermore, the binder might be incapable of securely binding all the material. The result of the last-named difficulty is that the surface of the dry mixture appears to be somewhat flaky or crumbly.

The thermochromic film may be placed on any suitable substrate. In certain applications, a substrate of good thermal conductivity, such as copper, aluminum, or silver, may be desired. If it is desired to employ cuprous mercuric iodide on an aluminum substrate, it may be necessary to protect the aluminum by applying an isolation layer of, for example, acrylic plastic or the like. Such protection is usually required since aluminum reacts to some extent with cuprous mercuric iodide. Since protection is so easily accomplished, this property of the thermochromic material constitutes no significant obstacle.

An alternative manner of placing the thermochromic material on a substrate is to incorporate the material within or on a thin film of polyethylene (or other polymeric material) when the film is being manufactured. The completed film may then be mechanically held adjacent a substrate, if desired, by a vacuum system, or secured to the substrate with a suitable adhesive.

Figure 1:
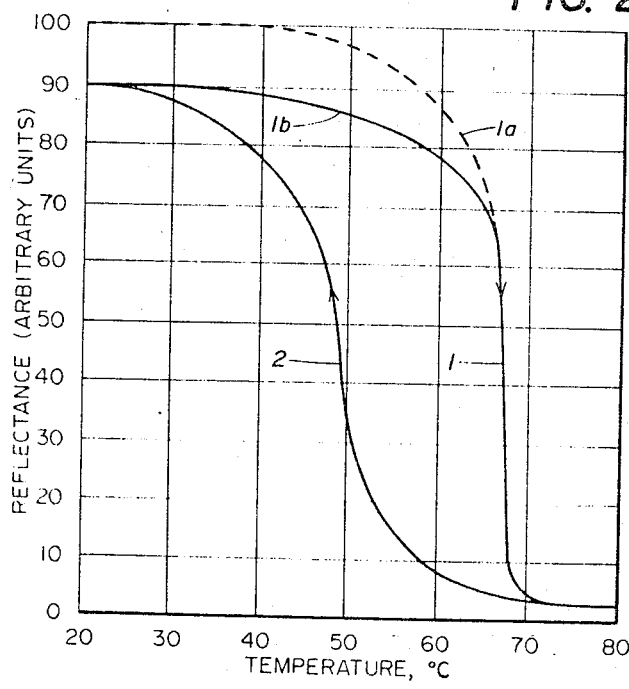
FIG. 1 is a schematic plot of reflectance of red light versus temperature for cuprous mercuric iodide.

The hysteresis observed in cuprous mercuric iodide is graphically illustrated in FIG. 1. Line 1 represents the plot of the reflectance of red light (in arbitrary units) versus temperature as the material is heated from room temperature to approximately 80° C. Line 2 represents the plot of reflectance versus temperature as the material is cooled from about 80° C to room temperature.

Referring initially to FIG. 1, it will be observed that cuprous mercuric iodide is a bright red at room temperature and retains its full brightness until it reaches approximately 45° c. Thereafter, increasing the temperature causes the material gradually to lose some of its reflectance. After reaching about 66° C the reflectance decreases rapidly until the material appears so dark that is may be properly described as black near 70° C; a further increase in temperature has little appreciable effect on the color of the material. Above about 70° C, the material may be described as being in its saturated black state, and additional heating produces no appreciable change in reflectance until temperatures are reached which cause chemical change, such as oxidation.

When the same material is cooled from its saturated black condition, a plot of reflectance versus temperature does not follow the same path which it followed when the temperature was being increased. Instead, the material demonstrates what is conveniently described as a classical hysteresis effect. Reflectance increases with decreasing temperature along a path indicated by line 2 which is displaced some 16° or 17° below (to the left of) the temperature-increasing path indicated by line 1. The rate of increase in reflectance decreases when the material cools below about 45° C, and the material does not reach its maximum reflectance (i.e., it is not red saturated) until it reaches about -b 30° C. As with the temperature increase above the black saturated condition, a temperature decrease below 30° C has little effect. Once the material is red saturated, a further decrease in temperature produces essentially no further change in reflectance.

It should be noted that in some thermochromic materials, the hysteresis curve may not be truly symmetrical (in the classical sense), particularly if the temperature cycle time is short. For example, it has been experimentally observed that cuprous mercuric iodide may not recover its full red reflectance immediately when rapidly cooled from a high temperature. Thus, when the material is rapidly cooled to about room temperature, because of the delayed recovery the material may not immediately reach the original 100 percent red saturation condition. In the initial cold state the hysteresis curve proceeds along line $1a - 1$ and, upon cooling, follows line 2. If the material is reheated shortly after the above-described cooling, the increasing temperature versus reflectance plot will follow line $1b - 1$. However, with sufficient time lapse between cooling and reheating, the low temperature reflectance will approach the 100 percent red saturation condition. Delayed recovery is of little consequence to this invention, however, since it occurs near the low temperature end of the hysteresis loop, while in those cases pertinent to this invention the material is used near the red-to-black transition temperature. Said red-to-black transition temperature is defined as the point on a temperature—increasing curve at which the curve has an inflection point. Accordingly, the hysteresis curves referred to hereinafter will ignore the delayed recovery and will be referred to as if they were always like the curve shown in lines $1b - 1$ and 2, i.e., as if they were essentially as symmetrical as classical hysteresis curves.

Since the temperature at which thermochromic materials can be accurately said to be 100 percent saturated is difficult to ascertain (because it approaches a true 100 percent saturated condition asymptotically), it is more practical to assign the term "saturated" to describe any reflectance condition which is within about 5 percent of a pure saturated condition (disregarding the aforementioned delayed recovery effect). Thus, cuprous mercuric iodide in its cold state (after being cycled through the hysteresis loop) can be said to be red saturated at any reflectance within 5percent of the top of the loop, while the material in its heated condition may be said to be black saturated when its reflectance is within 5 percent of the height of the loop above the pure black saturated reflectance.

While necessity dictates that a reflectance of 5 percent or less, for example, be accepted as equivalent to no reflectance, prudence dictates that the definition of "saturation" should not be treated too loosely. Hence, it is not intended herein to use the term "saturation" so as to encompass, for example, reflectances well between the knees of the hysteresis envelope.

The two paths traced on FIG. 1 indicating reflectance of the material in transition between its two extreme reflectances form a loop which constitutes the envelope that will enclose all of the paths followed by the material regardless of its temperature history. The hysteresis loop, then, may be said to be bounded on its high end by minimum temperature at which the material is black saturated, and bounded on its low end by the maximum temperature at which the material is red saturated. The fact that the ends of a loop may not always be precisely locatable with a particular material is of little consequence, since the operating region of the invention is usually in the vicinity of the center of the transition temperature range.

Figure 3:
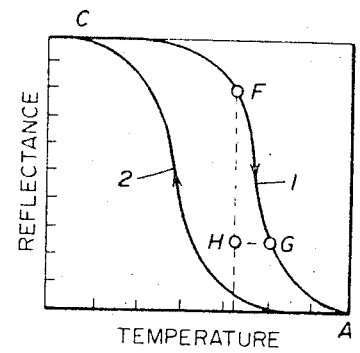
FIG. 3 is a schematic plot of reflectance versus temperature for a thermochromic material of the class described herein.

Characteristic behavior of thermochromic materials within the hysteresis loop is illustrated in FIG. 3. As explained above, a thermochromic material will exhibit a change in reflectance upon being heated which is indicated by line 1 in FIG. 3. As the material is heated along line 1 from point C to point F, its reflectance begins to change. If, however, part of the material is held at a constant temperature equivalent to point F and the remainder heated further along line 1 to point G, the tow portions of the material will exhibit different reflectances. Furthermore, if the hotter portion of the material is allowed to cool without first being heated to point A, the decreasing reflectance versus temperature plot will not follow line 1, but will be in the direction of point H. When the heated portion has cooled to the temperature of point H, the two portions of the material, although again at thermal equilibrium, will exhibit diverse reflectances as a result of their different thermal histories.

It should be noted that the plot of reflectance versus temperature for the material being cooled is shown as a horizontal line from point G to point H. However, as with conventional hysteresis phenomena, the decreasing temperature plot of reflectivity versus temperature actually will be in the general direction of line 2, but will approach line 2 asymptotically.

From the foregoing it will be observed that because of the hysteresis effect, optical images may be thermally generated in thermochromic materials by selectively varying the temperatures of portions of a thermochromic film. The image thus formed will be preserved in the film as long as the temperature of the film is maintained within the temperature range encompassed by the hysteresis loop. The image, however, can be erased by simply heating the film to its black saturation temperature, e.g., to a temperature above the hysteresis loop.

It has also been discovered that thermochromic materials exhibit another unique phenomenon which is not analogous to magnetic memory; that is, a thermochromic film upon which an image has been formed by the techniques described above will retain the information stored therein even though the temperature of the film is temporarily lowered below the hysteresis loop. For example, if an entire film of thermochromic material is heated from point C (referring still to FIG. 3) to point F, and part of the material is maintained at a temperature corresponding to point F while the remainder is heated to point G, the two portions will exhibit diverse reflectances as explained hereinabove. If the temperature of the entire film is then reduced below the temperature of point C (without being heated to a temperature above point A), the entire film will return to a condition at which the reflectances of all of its portions will correspond to point C. To the naked eye, the appearance of all of the material will be the same. However, the thermal histories of the two portions are different, and, upon reheating the film to a temperature at least as high as point F, the earlier obtained diverse reflectances will again be exhibited. Thus, the different thermal histories of the two portions have an effect on the thermochromic material which permits reestablishment of the image recorded thereon.

Figure 2:
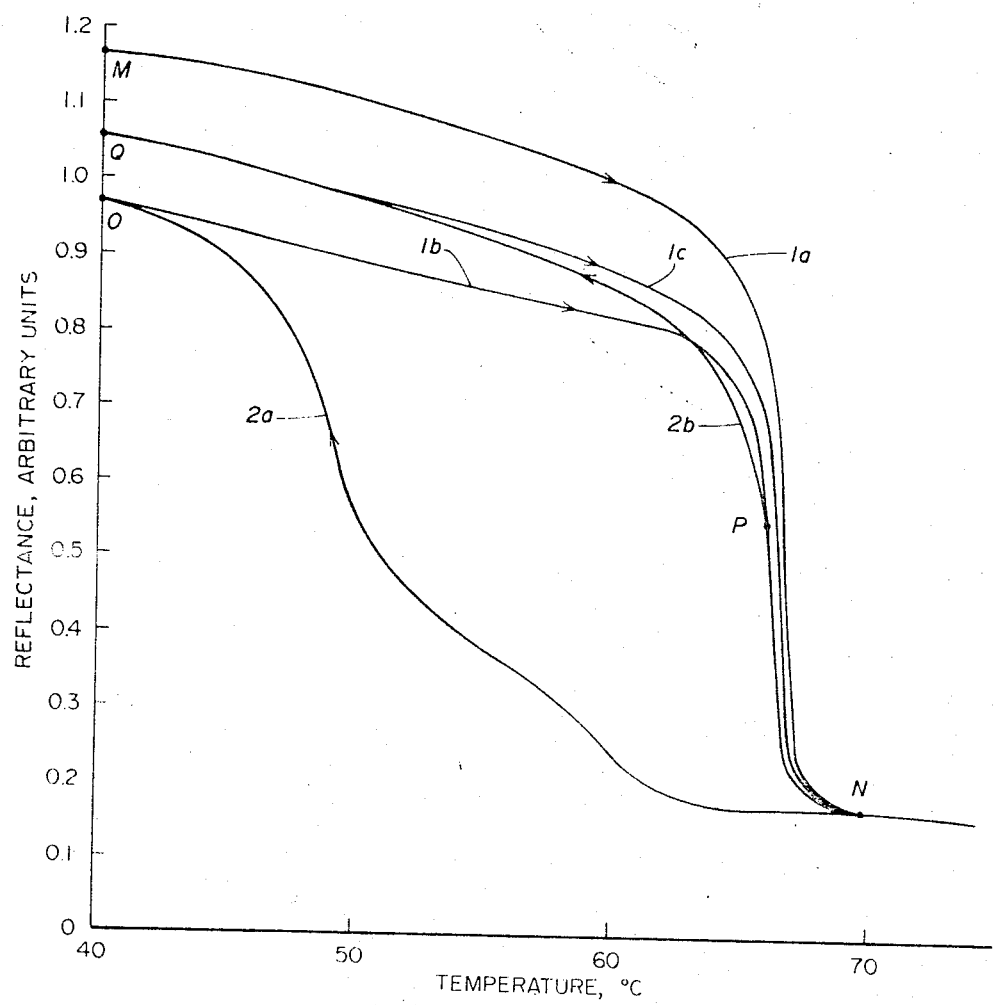
FIG. 2 is a plot of experimentally determined values of reflectance of red light versus temperature for cuprous mercuric iodide.

To better explain this special memory effect, reference will now be made to FIG. 2 which includes an accurate representation of one of the minor hysteresis loops in cuprous mercuric iodide (in silicone varnish). Starting with material having no residual thermal history effects, heating it will cause it to pass through point M along curve 1a to point N. Cooling it will cause it to follow curve 2a to point O. Promptly reheating the material will cause it to follow curve 1b. Regardless of how many times the material is cycled so as to include points N and O, the material will follow curves 1b and 2a. If, however, the material is heated only to point P and then cooled, a substantial portion of the cooling curve 2b surprisingly will lie above curve 1b. Continued cooling will carry the material to point Q. Prompt reheating of such material will cause it to follow curve 1c, which is lower than curve 1a but —most significantly— slightly higher than and to the right of curve 1b. Let it now be assumed that one portion of the material was held at point P while another discrete portion of the material was heated to point N, and then both portions were cooled (to points Q and O, respectively). Reheating all the material will cause respective portions to follow curves 1c and 1b. Returning to a temperature corresponding to the temperature of point P will produce different reflectances in the material, because that portion of the material following curve 1b will exhibit a lower reflectance than that portion of the material following the higher curve 1c. Of course, the difference between the two recreated diverse reflectances is not quite as great as the difference originally established, but it is still appreciable. Further, reheating to a temperature slightly above the temperature corresponding to point P has been found to improve the contrast of the recreated image, because the reflectance given by curve 1b is decreasing at a more rapid rate immediately above the temperature of point P than is the reflectance given by curve 1c.

It should perhaps be noted that in the nearly vertical portions of the curves, it is difficult to determine exactly how far apart the curves are spaced because of certain inherent experimental errors in temperature measurement and recording techniques. But the fact that images can be recreated after all of the material has been cooled to the temperature of point O, and the further fact that the contrast of the image is easily discernable with the naked eye, clearly indicates that the curves are separated by an appreciable amount.

The diverse thermal histories, and thus the information stored in the material, do not produce a permanent change in the material. When the temperature of the material is reduced below the temperature of point O, the information recorded thereon is stored only for a relatively short period. Upon reheating the material after storage for several days, the difference in reflectance of the two portions will be substantially less. Thus the image will appear to have faded. The length of time an image will remain stored in a thermochromic film held at temperatures below the hysteresis loop appears to depend largely on the difference in reflectances recorded on the film. Thus, the greater the difference between the holding temperature and the recording temperature, the longer the storage time at temperatures below the hysteresis loop. While the contrast between an image and its background deteriorates with time, the resolution of the image does not deteriorate because all of the material remains in thermal equilibrium throughout this phase of the process.

Form the foregoing it will be observed that information recorded in the material through deliberately varied thermal conditions impressed on the material can be semipermantly stored in the material by simply reducing the temperature thereof below the hysteresis loop. The stored information can be reproduced at will be simply raising the temperature of the recording medium back to at least the holding temperature, e.g., point P. Of further advantage, when the recording medium is stored at a temperature below the saturation temperature corresponding to point O, it is immune to further change by accidental or inadvertent exposure to energies which would produce significantly different thermal histories if the material were stored at temperatures within the hysteresis loop. Thus, information recorded therein may be stored for short periods of time at temperatures below the loop and such information is not easily accidentally destroyed.

It should be noted, however,that if the material is maintained at the holding temperature (i.e., point P) at all times after the information is recorded therein, such information will be stored indefinitely. In fact, the thermally produced image can remain permanently stored in the material until it is erased by heating the material to a saturation temperature above point N.

Selective thermal changes in thermochromic materials may be effected by many various techniques. The method selected will depend upon the form in which the thermochromic material is utilized as well as the use for which it is intended. For example, when a thermochromic film is maintained at any temperature within the hysteresis loop (e.g., point F in FIG. 3), relatively little additional energy need be selectively added to raise discrete portions of the thermochromic material to higher temperatures, thus writing information into the material. Temperature increases as slight as one-fourth degree centigrade are sufficient to produce wide changes in reflectance when using the steep portion of line 1 which is about midway between the knees of the curve. Therefore, information can readily be recorded on the thermochromic material with any source of energy which will be absorbed by the thermochromic material.

In accordance with one embodiment of the invention, images formed in the thermochromic material are produced by absorption of radiation patterns impinging on the thermochromic film. When a source of radiation of known wavelength is used to supply the thermal energy to the thermochromic material, the material should be selected so that it has a high value of absorptivity at the wavelength used. In the visible portion of the spectrum, cuprous mercuric iodide is highly reflective in the red. However, this material absorbs other visible wavelengths. For example, blue or green light having a wavelength of 5500 angstroms or less may be used to impart sufficient thermal energy to the material to produce thermal images. Therefore, images may be projected on the thermochromic material with light from one portion of the visible spectrum and the image immediately recorded in the film (without conventional photographic processing) and become immediately visible because of the changed reflectance of the material in another portion of the visible spectrum. Furthermore, holographic fringe patterns may be recorded in the film with visible wavelengths and conventional holograms produced by simply photographing the stored pattern. A plot of experimentally observed values of reflectance versus wavelength for $Cu_2HgI_4$ in the infrared is shown in FIG. 7.

Figure 7:
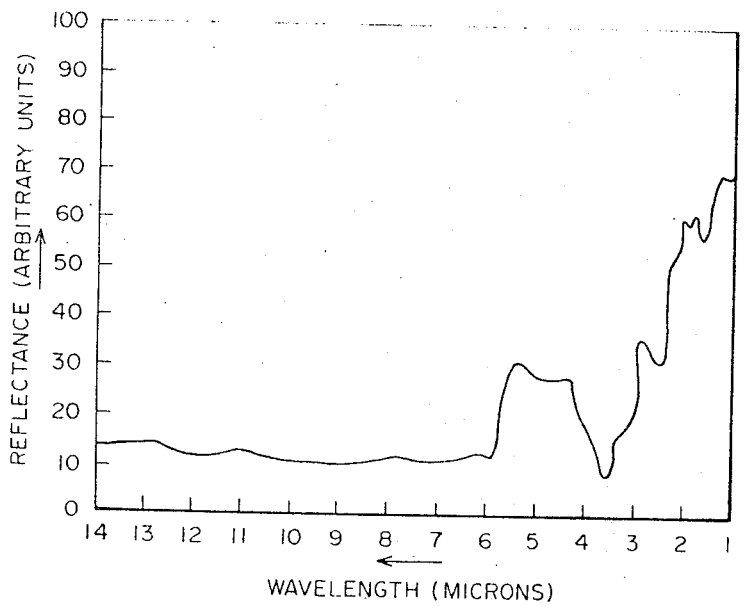
FIG. 7 is a plot of reflectance versus wavelength for cuprous mercuric iodide.

Referring to FIG. 7, it will be observed that this material has a very low reflectance in the 6 to 14 micron region. Thus, $Cu_2HgI_4$ is well suited for absorption of infrared energy and particularly well suited for absorption of the 10.6 micron radiation of the standard carbon dioxide laser. The advantages of cuprous mercuric iodide will be even more appreciated in view of the ready availability of $CO_2$ lasers of high quality.

Furthermore, it has been unexpectedly discovered that extremely high resolution can be obtained in thermally generated images. In fact, the spatial resolution exhibited by $Cu_2HgI_4$ exceeds that of most photochemical films and is inferior only to the best high resolution spectroscopic plates. Resolution quality in the 1 micron range is routinely observed in recording images by simply focusing the optical image on a film of thermochromic material and insuring that the beam power is sufficient to permit rapid exposure. Quite surprisingly, heat from such optical images does not significantly diffuse within the material during exposure times of interest. Of course, significant diffusion of the energy could be caused by application of greatly excessive amounts of energy through longer exposure times. Such application of excess energy would be comparable to overexposure of ordinary light recording media. Overexposure can be avoided with the exercise of such ordinary care as one would observe in the use of equivalent high quality photographic emulsions with due attention to the reciprocity law formulated by Bunsen and Roscoe.

It will be apparent to those skilled in the art that the energy absorbed by the thermochromic film is proportional to the product of the power density of the beam and the exposure time. For exposure times of practical interest, this is equivalent to the reciprocity law ($E = Pt$) which is well known to those who work with photographic material. The reciprocity law of thermochromic materials differs from the reciprocity law of photographic materials, however, in that an upper limit exists on the exposure time, said upper limit being dependent on how much diffusion of heat through the film is tolerable. To keep diffusion low and thus achieve the high resolution which is needed in holography, the power density of the beam should be adequate to permit absorption of sufficient energy to cause a change in reflectance within a period of time that is not appreciably greater than and preferably is shorter than the ratio of the square of a given diffusion length and the material's thermal diffusivity.

A lower limit also exists on the power density of the exposing radiation, i.e., the material has a threshold below which no exposure will occur. This threshold has been experimentally found to be about 150 milliwatts/cm² for cuprous mercuric iodide in silicone varnish. Such a threshold is related to the above-mentioned upper limit on time in that the threshold is a function of the thermal properties of the material. The threshold exists because the temperature of a spot at which heat is being applied will never rise to the extent that a change in reflectance is observed if the power of the beam is so low that heat can diffuse through the material at least as fast as heat is being applied. Fortunately, the power density threshold has always been found to be so low as never to constitute a limitation on use of the material. Furthermore, the minimum exposure time involved (even for resolutions of one micron) are sufficiently long that they can be easily obtained and do not lead to prohibitively large power densities.

The thermal diffusivity of a material is given by the equation:

$$k = K/c_p \rho$$

where
$c_p$ = specific heat of film at constant pressure, cal/gm °C
$\rho$ = density of film, gm/cm³
$K$ = thermal conductivity of the film, cal/cm °C sec To treat the aforementioned diffusion length, let it be assumed that heat is applied to a finite spot on the surface of the material. The excess radius $l$, of the resulting spot at a time, $t$, after application of heat is given by $$l = \sqrt{kt}$$

where $k$ is the thermal diffusivity. The excess radius $l$ in this example is more generally referred to as the diffusion length. To achieve good resolution, $l$ must naturally be kept low; exactly how low seems necessary is, of course, dependent upon the wavelengths of the electromagnetic radiation being used in the holographic process. Since the thermal diffusivity of a given material is fixed, control of diffusion length is achieved by keeping the time of application of heat short.

To illustrate how diffusion of heat is controlled, let it be assumed that a beam of radiant energy is focused to a diameter of one micron. When the beam impinges on the film, the directly heated spot is thus one micron in diameter. Let it next be assumed that it is desired to limit thermal diffusion of heat through the film so that after the beam has been removed the resulting spot is no larger than 2 microns. To determine how fast the heat must be applied, the thermal time constant, $\tau$, for this example must be calculated. The excess of spot diameter due to diffusion of heat is $2 - 1 = 1$. Thus, $l$ is one-half of this, or $½ \times 10^{-4}$ cm. Assuming the film to be cuprous mercuric iodide suspended in a silicone varnish, a value for the specific heat (at the upper transition temperature) of about 1.1 calories/gram °C is realistic. The density of cuprous mercuric iodide is about 6 gms/cm³, and the density of the silicone varnish is about 1 gm/cm³. Since relatively little varnish is necessary to hold the thermochromic material, a density of about 5 gm/cm³ for the dry film is typical. The thermal conductivity of the film will usually be influenced by the vehicle, which has the lower thermal conductivity. Since the thermal conductivities of varnishes are relatively low, the value for the silicone varnish is reasonably assigned as the value of thermal conductivity for the entire film, e.g., $5 \times 10^{-6}$ calories/second-centimeter-°C. (Because the time periods are very short, the thermal characteristics of the substrate usually have no bearing on resolution in the film). Using the aforementioned equation and these exemplary values, this particular thermal constant is found to be $2.5 \times 10^{-3}$ sec, as follows:

$$\tau = l^2/k = l^2 c_p \rho / K$$
$$= (1/2 \times 10^{-4})^2 (1.1)(5)/(5 \times 10^{-6})$$
$$= 2.5 \times 10^{-3} \text{ sec}$$

If the exposure time is appreciably greater than the thermal time constant, e.g., more than 10 times the thermal time constant, then one can expect that diffusion of heat away from the spot where heat is actually being applied would produce deleterious effects similar to "blooming" in photographic materials.

Assuming that the maximum exposure time which can be permitted is the time period to limit diffusion to one-half micron, it must next be determined what power the beam must have in order to raise the temperature of the material by the desired amount. It has been experimentally determined that an exchanged energy density of about 100 millijoules/cm² is sufficient to change the reflectance from a value near one end of the hysteresis loop to a value near the other end of the loop. (Calculation of the theoretical exchanged energy density—disregarding all losses—has given a value on the order of 15 millijoules/cm² ). Next, dividing 100 millijoules/cm² by the time period of 2.5 × 10⁻³ seconds, the power of the necessary beam is determined to be about 40 watts/cm². For the assumed beam diameter of 1 micron, the power required would be a modest 0.3 microwatts.

In situations where less precise resolution can be tolerated, the exposure time can be lengthened and the power requirement reduced in accordance with the aforementioned reciprocity law. For example, an exposure time of ¼seconds has been employed with the material described above, and the resolution was determined to be at least as good as 50 microns. On the other hand, a 10 watt carbon dioxide laser beam focused to a diffraction-limited spot will supply sufficiently energy to raise the temperature of the thermochromic film illuminated thereby at least one-fourth degree centigrade with exposure times in the nanosecond range. Faster heating may be accomplished with appropriate energy sources.

The exposure time and the energy absorbed from the beam have been emphasized herein as if these two parameters along dictated the total diffusion which will be realized. This is essentially correct, although a thorough study of FIG. 3 will reveal that these two parameters are involved only in that portion of the cycle represented by the curve segment from point F to point G. Removal of the heating source at a time when the material has been heated to point G does not simultaneously terminate the diffusion of all heat away from the spot which the beam or beams actually struck; diffusion actually terminates only when the temperature of the locally heated spot has returned to the temperature of the remainder of the material, i.e., when the heated and non-heated portions have again reached thermal equilibrium. However, the diffusion of heat associated with cooling, e.g., from point G to point H in FIG. 3, is not nearly as great as that associated with heating. The diffusion of heat is lower because there is an anomaly in the specific heat curves for heating and cooling just as there is an anomaly in the two reflectance curves. The average of the specific heat values of cuprous mercuric iodide in cooling from point G to point H is only about one-tenth as large as the average value for the corresponding portion of the heating curve. Thus, whatever heat is still being diffused as the material cools from point G to point H is leaving a region of relatively low specific heat and entering a region of high specific heat. Accordingly, heating of the surrounding region by virtue of diffusion effectively terminates as soon as the heat source is removed.

The discovery of the extremely high resolution capability is most unexpected, since high resolution is not normally associated with thermally generated images. However, with the resolution capabilities demonstrated, thermochromic material may be used, inter alia, as the recording medium for high quality holograms. Furthermore, this material can be used to produce holograms derived from radiation in the far infrared as well as portions of the visible spectrum. It is believed that the ultimate resolution which can be obtained is singularly a function of the grain size of the material, which fortuitously can be very small, e.g., at least as small as 1 micron.

It is to be understood that the terms "hologram" and "holographic images" are used herein in their conventional sense to describe the recording and reproduction of optical images by recording both intensity and phase information of radiation transmitted through or reflected from an object. In general, two beams of coherent radiation are used to produce holographic interference patterns. One beam is directed onto the object, and the radiation transmitted through or reflected from the object is directed onto a recording medium. The other beam which has a fixed phase relation with the first beam is also directed onto the recording medium. The interference pattern formed by interference of the two beams at the surface of the recording medium is referred to as a hologram. Since the art of holography is known and, as applied to use of the visible portion of the spectrum, forms no part of this invention, it will not be explained in more detail herein. The use of holographic methods, however, to record images in the longer wavelengths (which may then be reproduced in the visible) has been frequently attempted but seldom—if ever—achieved. Furthermore, the recording of holographic interference patterns has been particularly difficult to achieve using off-axis holographic methods wherein high resolution of the recording medium is much more important than with on-axis holographic methods.

Figure 4:
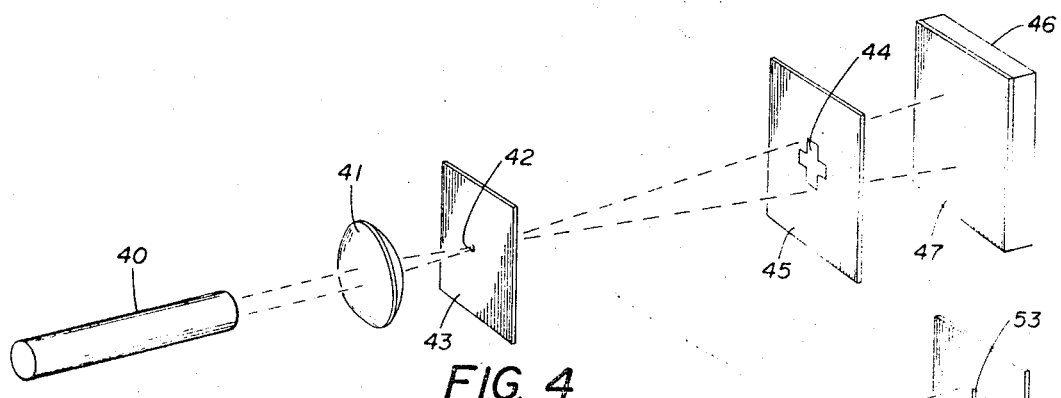
FIG. 4 is a schematic representation of apparatus for producing infrared holograms using an on-axis technique.

Apparatus suitable for producing holograms in the infrared in accordance with one embodiment of this invention is schematically illustrated in FIG. 4. The apparatus comprises a source 40 of infrared energy such as a carbon dioxide laser. Radiation from the source 40 is passed through a suitable lens 41. In the case of a $CO_2$ laser as the source providing 10.6 micron radiation, germanium may be used for the optical components such as lens 41. The radiation is then passed through a pinhole 42 in a mask 43, located at the focal point of lens 41, and allowed to strike the object.

In the embodiment shown in FIG. 4, the object simply comprises a cross-shaped hole 44 in a sheet 45 of opaque material. Interference patterns from the light diffracted from the edge of hole 44 are formed on the hologram plate.

In the embodiment illustrated, the hologram plate comprises a substrate 46 of high thermal conductivity upon which is deposited a film 47 of thermochromic material such as $Cu_2HgI_4$ formed as described hereinabove.

Referring now to FIGS. 1 and 3, it will be observed that the film 47 should be maintained at a bias temperature within the hysteresis loop and just below the temperature at which a large color change can be observed. The material therefore is heated to and maintained at a point on the transition curve approximately corresponding to point F in FIG. 3, which would be about 66° C for cuprous mercuric iodide. Since the thermochromic material absorbs energy in the 10.6 micron region, the beams interfering at the surface will selectively heat portions of the film 47 to point G in a pattern precisely corresponding to the interference pattern, thus forming a holographic fringe pattern in the film 47. Due to the change in reflectance with temperature, the hologram will be visible even though formed with 10.6 micron radiation. When the interfering beams are blocked off and no more energy is striking the surface, the heated portions will cool to the bias temperature at point H. Then, as long as the film 47 is maintained at the bias temperature, the image will remain visible.

The apparatus of FIG. 4 is exemplary of conventional apparatus for on-axis holography except for the thermochromic recording medium and the components of the optical system which are adapted to be compatible with the particular wavelength used. The radiation passing unaffected through the cross-shaped hole (the object) is used as the reference beam, and the radiation diffracted from the edges of the object 44 constitutes the beam containing information about the object. Likewise, by proper selection of the radiation source and other optical elements in the system, off-axis holography could be accomplished using the thermochromic material as a recording medium. Furthermore, although in the optical systems shown and described in detail herein, optical information is derived by passing radiant energy through the object, optical information can likewise be derived by reflecting the image beam from the object in the fashion similarly used with visible wavelengths.

The hologram recorded in film 47 may be used for any purpose for which holograms are generally used. The image information recorded therein may be stored for short periods by simply lowering the temperature of the film below the temperature corresponding to point C on FIG. 3. Although the information disappears as the temperature is lowered, it will reappear substantially as recorded upon again raising the temperature to point F. Thus the hologram can be prepared and stored without further processing, and as long as the thermochromic material is stored at a temperature below the hysteresis loop, the recorded image will be immune to accidental change Furthermore, the image can be erased and the film 47 reused as desired by simply raising the temperature of the film to point A.

Reconstruction of the image recorded in the hologram 47 may be accomplished by transferring the information recorded in the thermochromic material to a standard photographic emulsion. This may be readily accomplished by simply photographing the film on which the image is displayed and reproducing the hologram in a photographic emulsion which is transparent in the wavelength used. Holographic reconstruction is readily accomplished by passing a beam of infrared energy of the same wavelength as that used for recording of the hologram through the emulsion. The image so reconstructed will be an infrared image precisely corresponding to the original object. The image recorded in the hologram 47 may also be reconstructed in the visible to produce a visible image through the use of apparatus such as that shown in FIG. 5.

To reproduce the image in the visible, the information recorded in the hologram film 47 must be first reduced by a factor equivalent to the difference in recording wavelength and display wavelength. For this purpose, a photograph may be made of the surface of film 47 after the image is formed thereon while the film is maintained at or near the recording temperature. The photograph is then reduced in size by conventional photographic techniques to produce a photographic emulsion replica of reduced size of the interference pattern displayed on film 47.

In the preferred embodiment, the holographic information is recorded using a carbon dioxide laser (wavelength 10.6 microns) and display in the visible is accomplished with a helium-neon laser (wavelength 6328 angstroms). Thus, the holographic image recorded on film 47 must be reduced by a factor of approximately 16:1. The photographic emulsion produced will be a conventional hologram.

Figure 5:
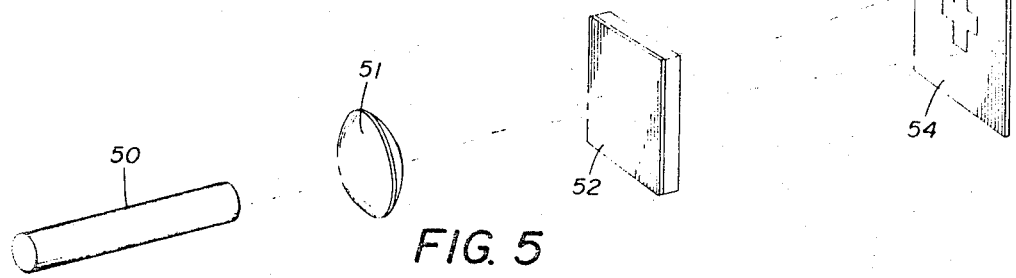
FIG. 5 is a schematic representation of apparatus for reconstructing the fringe pattern obtained in FIG. 4 in the visible portion of the spectrum.

Referring to FIG. 5 there is shown a helium-neon laser 50, the radiation from which is focused by lens means 51 to transmit radiation through the photographic emulsion 52 produced as described above. Reconstructed image 53 is displayed on a suitable screen 54. It will be noted that reconstructed image 53 was recorded with infrared energy but is now displayed in the visible range. Thus the original image, although not visible to the naked eye, is reconstructed in the visible in full detail and original size.

From the foregoing it will be observed that through the use of thermochromic recording media as disclosed herein, holograms may be recorded using infrared radiation and the images reconstructed with visible radiation. Consequently, the internal optical density of a vast number of materials transmitting in the infrared but absorbing in the visible may be examined with infrared energy, variations in the optical density thereof holographically recorded, and three-dimensional images thereof reconstructed in the visible portion of the spectrum for visual examination. For example, grain boundaries, diffused regions, metallized areas, and any other physical feature of a material nominally transparent to infrared which locally alter the optical density of the material in the wavelength used, can be holographically recorded and three dimensional images thereof reconstructed in the visible for visual examination.

Figure 6:
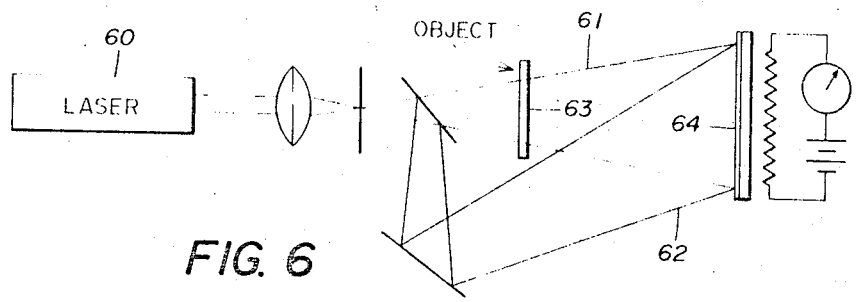
FIG. 6 is a schematic representation of apparatus for producing holograms using an off-axis technique.

The apparatus in FIG. 6 is exemplary of an apparatus for producing a hologram of the infrared properties of an object. A source of infrared energy 60 (such as a $CO_2$ laser) produces a beam which is split to provide an object beam 61 and a reference beam 62. After striking the object 63 and being altered in accordance with the object's varied transmissivity to infrared radiation, the object beam 61 will contain information about the optical properties of the object. Since both beams 61, 62 originated from the same source, the reference beam 62 has a fixed phase relation with the object beam 61. When the two beams 61, 62, intersect at the surface of a suitably biased thermochromic film 64, an interference pattern will be recorded in the film. Of course, the power of the object and reference beams must be adequate as described herein to permit absorption of sufficient energy to cause a rapid transition in discrete portions of the film 64 from the bias reflectance to a second reflectance. Preferably, both the bias and second reflectances are within the hysteresis loop of the thermochromic material. The individual elements of the interference pattern may or may not be visible to the naked eye, since the eye normally cannot discern any spot smaller than about 30 microns. But the overall appearance of the film 64 will almost certainly be altered in such a way as to be visible. The advantage of this immediate change in appearance is that it permits a prompt verification that the system (which employs invisible radiation) is operational. This immediate check should be mentally compared with the necessity of developing photographic plates before it is known whether or not an interference pattern has been recorded. Even if high resolution photographic plates were sensitive to infrared radiation, they would still have the developing requirement which thermochromic materials do not have.

It is to be understood that although the invention has been described with particular reference to specific embodiments thereof, the forms of the invention as shown and described in detail are to be taken as preferred embodiments of same, and that various changes and modifications may be resorted to without departing from the spirit and scope of the invention.

What is claimed is:

1. The method of recording holographic information derived from radiant energy, comprising the steps of:
 a. establishing a thermochromic material at a given temperature, said material having a reflectance hysteresis loop associated with changes in temperature over a certain range, and said given temperature being within the hysteresis loop range; and
 b. directing first and second beams of coherent radiation at the surface of said material, said first beam containing said information and said second beam having a fixed phase relation with said first beam, and said beams intersecting at the surface of the thermochromic material so as to form an interference pattern, and the power of said beams being adequate to permit absorption of sufficient energy to cause localized transition in the material from one reflectance to another in a period of time that is not appreciably greater than the ratio of the square of a given diffusion length and the material's thermal diffusivity, wherein the diffusion length is established by the resolution required to record said interference pattern.

2. The method as set forth in claim 1 wherein said thermochromic material is $Cu_2HgI_4$ and said given temperature is about 66° C.

3. The method of recording holographic information as claimed in claim 1 wherein the thermochromic material is initially cooled to a temperature near the low-temperature end of the hysteresis loop, and directly thereafter is heated to the aforementioned given temperature.

4. The method of recording holographic information as claimed in claim 1 wherein the material is initially heated to a temperature at least as high as the upper limit of the hysteresis loop prior to establishing said given temperature, so as to irretrievably erase any latent images in said thermochromic material prior to directing said beams of coherent radiation at the surface of said material.

5. The method as set forth in claim 1 and including the further steps of rendering the recorded interference pattern immune to change by cooling the material to a temperature near the low-temperature end of the hysteresis loop, and subsequently recovering said holographic information by restoring the temperature of the film to approximately the temperature at which said hologram was recorded.

6. The method as set forth in claim 1 and including the further steps of temporarily rendering the recorded interference pattern immune to change by temporarily lowering the temperature of the entire material below the hysteresis loop, and subsequently causing said holographic information to reappear by raising the temperature of the material to a temperature at least as great as said given temperature but less than an erasing temperature.

7. The method of producing a hologram of the infrared properties of an object, comprising the steps of:
   a. establishing a thermochromic film at a given temperature, said material being characterized as an absorber of infrared energy and having a reflectance hysteresis loop associated with changes in temperature over a certain range, the hysteresis loop being bounded by a maximum saturation temperature associated with its low temperature reflectance and a minimum saturation temperature associated with its high temperature reflectance, and said given temperature being between the maximum and minimum saturation temperature; and
   b. directing first and second beams of mutually coherent infrared energy onto the surface of said thermochromic film in a way such that they intersect to form an interference pattern thereon, said first beam containing information about the optical properties of said object and said second beam having a fixed phase relation with said first beam, and the power of said beams being adequate to permit absorption of sufficient energy to cause a rapid transition from one reflectance to another within the loop, and the time of transition being a time period which is not appreciably greater than the ratio of the square of a given diffusion length and the film's thermal diffusivity, wherein the diffusion length is established by the resolution required to record said interference pattern.

8. The method of producing a visible image of the infrared properties of an object, comprising the steps of:
   a. establishing a film of thermochromic material at a temperature at which it exhibits at least a double-valued function of reflectance versus temperature, said material having a reflectance hysteresis loop associated with changes in temperature over a certain range;
   b. producing an object beam and a reference beam from a source of coherent infrared energy;
   c. directing said object beam at said object such that the infrared energy scattered from said object impinges on a recording medium comprising the film of thermochromic material which is at the above-mentioned temperature;
   d. directing said reference beam onto said thermochromic material so that the beams form a finely detailed interference pattern and the power of said beams being adequate to permit absorption of sufficient energy to cause a rapid transition from one reflectance to another within the loop, whereby the irradiated portions of the thermochromic film have their reflectance changed so as to produce a visible image of said interference pattern on the surface of said film, and the time of transition being a time period which is not appreciably greater than the ratio of the square of a given diffusion length and the film's thermal diffusivity, with the diffusion length being established by the resolution required to record said interference pattern;
   e. photographing said recording medium to produce a photographic replica of said visible image;
   f. reducing the size of said photographic replica by a factor corresponding to the ratio of the wavelength of the recording infrared beam to the wavelength of the reconstructing beam which is to be used; and
   g. passing a beam of coherent radiation of visible wavelength through the reduced photographic replica to accomplish the reconstruction of a visible image of the infrared properties of the object.

9. The method as set forth in claim 8 wherein:
   a. said beam of coherent infrared energy is the optical output of a carbon-dioxide laser;
   b. said photographic replica is reduced to approximately one-sixteenth the size of said visible image; and
   c. said beam of coherent radiation of visible wavelength is the optical output of a helium-neon laser.

10. Apparatus for recording a holographic image of the optical properties of an object, comprising;
    a. a film of thermochromic material having a reflectance hysteresis loop associated with changes in temperature over a certain range, the refleftance hysteresis loop of said material being bounded by a maximum saturation temperature associated with its low temperature reflectance and a minimum saturation temperature associated with its high temperature reflectance;
    b. means for establishing said film at a temperature approximately midway between the minimum and maximum saturation temperatures;
    c. laser means for generating first and second beams of coherent infrared radiation, said first beam having a fixed phase relation with said second beam;
    d. means for directing said first beam onto said object and for directing radiation scattered by said object onto said film;
    e. means for directing said second beam onto said film to intersect with radiation scattered by said object, thereby to produce interference patterns on said film which results in non-uniform heating of said film; and
    f. means for limiting the film exposure time to a period which is not appreciably greater than the ratio of the square of a given diffusion length and the film's thermal diffusivity, wherein the diffusion length is established by the resolution which is desired to accurately record said interference pattern.

11. Apparatus as defined in claim 10 wherein said thermochromic film consists essentially of material selected from the group consisting of:
    a. material having the general foumula
       $M_2M'X_4$
       where M is $Ag^{1+}$, $Cu^{1+}$ or $Tl^{1+}$ and
       M' is $Hg^{2+}$ or $Cd^{2+}$, and X is a halide;
    b. material having the general formula
       $MM'_2X_4$
       where M is zinc, cadmium or mercury,
       M' is aluminum, gallium or indium, and
       X is sulphur, selenium or tellurium; and
    c. the vanadium oxides.

12. Apparatus for producing a hologram of the optical density of an object which is opaque in the visible and at least partially transparent in the infrared, comprising:
    a. first means including a source of coherent infrared energy for producing an object beam and a reference beam;
    b. means for directing said object beam at said object;
    c. a thermochromic film which exhibits hysteresis in changing from a first reflectance to a second reflectance with changing temperature, the reflectance hysteresis loop of said film being bounded by a maximum saturation temperature associated with its low temperature reflectance and a minimum saturation temperature associated with its high temperature reflectance, said film being located so that the infrared energy transmitted through the object impinges on the film, and the power of said beams being adequate to permit absorption of sufficient energy to rapidly cause transition from one reflectance to another within the loop;
    d. means for establishing said thermochromic film at a temperature between said maximum and minimum saturation temperatures;
    e. means for directing said reference beam onto said film, thereby to produce interference patterns on said film; and
    f. means for limiting the film exposure time to a period which is not appreciably greater than the ratio of the square of a given diffusion length and the film's thermal diffusivity, wherein the diffusion length is established by the resolution which is desired to record said interference pattern.

13. The method of producing a hologram as claimed in claim 7 wherein the time of transition is less than 10 times the ratio of the square of a diffusion length and the film's thermal diffusivity.

14. The method of producing a visible image as set forth in claim 8 wherein the time of transition is less than 10 times the ratio of the square of the diffusion length and the film's thermal diffusivity.

* * * * *